(12) United States Patent
Stewart

(10) Patent No.: US 9,115,686 B2
(45) Date of Patent: Aug. 25, 2015

(54) WAVE ENERGY CONVERTER WITH ROTARY HYDRAULIC SPRING

(75) Inventor: David B. Stewart, Cranbury, NJ (US)

(73) Assignee: OCEAN POWER TECHNOLOGIES, INC., Pennington, NJ (US)

(*) Notice: Subject to any disclaimer, the term of this patent is extended or adjusted under 35 U.S.C. 154(b) by 391 days.

(21) Appl. No.: 13/430,599

(22) Filed: Mar. 26, 2012

(65) Prior Publication Data
US 2012/0247098 A1 Oct. 4, 2012

Related U.S. Application Data

(60) Provisional application No. 61/516,004, filed on Mar. 28, 2011, provisional application No. 61/516,003, filed on Mar. 28, 2011, provisional application No. 61/516,025, filed on Mar. 28, 2011.

(51) Int. Cl.
F03B 13/20 (2006.01)
F03B 13/16 (2006.01)
F03B 11/00 (2006.01)

(52) U.S. Cl.
CPC .............. *F03B 13/16* (2013.01); *F03B 11/00* (2013.01); *F03B 13/20* (2013.01); *F05B 2260/406* (2013.01); *Y02E 10/38* (2013.01)

(58) Field of Classification Search
CPC .................................................. F03B 1/00
USPC ........... 290/42, 53, 54; 60/495–498, 501, 502
See application file for complete search history.

(56) References Cited

U.S. PATENT DOCUMENTS

| | | | | |
|---|---|---|---|---|
| 2,478,013 A * | 8/1949 | Roddy | | 264/349 |
| 4,108,578 A * | 8/1978 | Corey | | 417/331 |
| 4,599,858 A * | 7/1986 | La Stella et al. | | 60/497 |
| 4,627,240 A * | 12/1986 | Holmes | | 60/507 |
| 6,247,308 B1 * | 6/2001 | Solell | | 60/495 |
| 7,305,823 B2 * | 12/2007 | Stewart et al. | | 60/495 |
| 7,443,046 B2 * | 10/2008 | Stewart et al. | | 290/53 |
| 7,891,181 B2 * | 2/2011 | Baltes | | 60/414 |
| 8,067,849 B2 * | 11/2011 | Stewart | | 290/53 |
| 8,487,459 B2 * | 7/2013 | Eder et al. | | 290/42 |
| 8,836,152 B2 * | 9/2014 | Hobdy | | 290/42 |
| 2006/0028026 A1 * | 2/2006 | Yim | | 290/53 |
| 2007/0235892 A1 * | 10/2007 | Zander et al. | | 264/85 |
| 2008/0000224 A1 * | 1/2008 | Swart | | 60/497 |
| 2008/0190105 A1 * | 8/2008 | Tai et al. | | 60/498 |
| 2009/0013691 A1 * | 1/2009 | Jones et al. | | 60/641.7 |
| 2009/0072540 A1 * | 3/2009 | McCague et al. | | 290/53 |

(Continued)

FOREIGN PATENT DOCUMENTS

WO    WO 2010067341 A2 * 6/2010

*Primary Examiner* — Thomas Denion
*Assistant Examiner* — Shafiq Mian
(74) *Attorney, Agent, or Firm* — Henry I. Schanzer

(57) ABSTRACT

The generally up and down movement of a reaction mass is converted into rotary motion which is used to drive a rotary hydraulic spring comprised of a rotary hydraulic pump motor and an accumulator to produce a "spring" function. The invention is particularly applicable to wave energy converters (WECs) having a reaction mass which needs to be coupled to a spring to ensure its oscillation and to cause it to be centered about its center of travel. The linear up-down motion of a reaction mass may be converted via a linear-to-rotary translator to rotary motion to drive a rotary hydraulic pump/motor so as to provide spring action to the reaction mass and ensure its oscillation and proper positioning.

17 Claims, 9 Drawing Sheets

(56) References Cited

U.S. PATENT DOCUMENTS

| | | | |
|---|---|---|---|
| 2009/0126798 A1* | 5/2009 | Mather | 137/12 |
| 2009/0146429 A1* | 6/2009 | Protter et al. | 290/53 |
| 2010/0064678 A1* | 3/2010 | Cucurella Ripoli | 60/501 |
| 2010/0089063 A1* | 4/2010 | McBride et al. | 60/682 |
| 2011/0198851 A1* | 8/2011 | Lama | 290/53 |
| 2012/0025531 A1* | 2/2012 | Montgomery et al. | 290/53 |
| 2012/0153624 A1* | 6/2012 | Sampaio | 290/53 |
| 2012/0235414 A1* | 9/2012 | Levy | 290/53 |
| 2013/0312979 A1* | 11/2013 | Ankargren et al. | 166/355 |

* cited by examiner

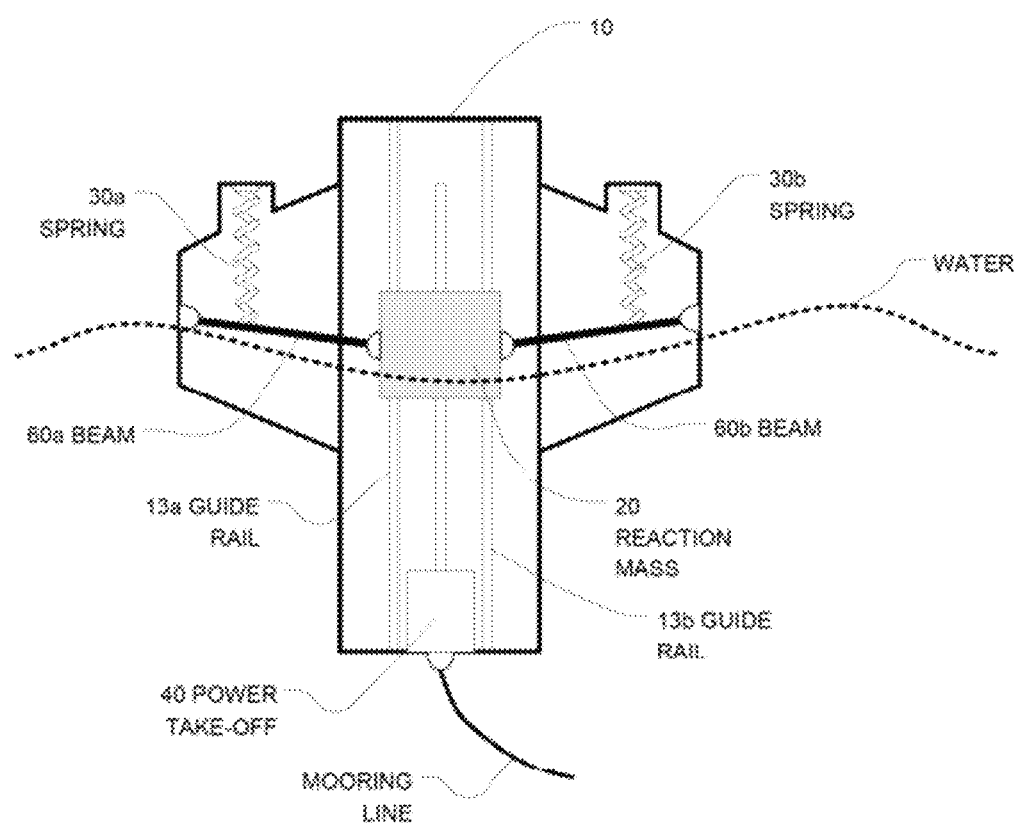
FIG. 1 – PRIOR ART

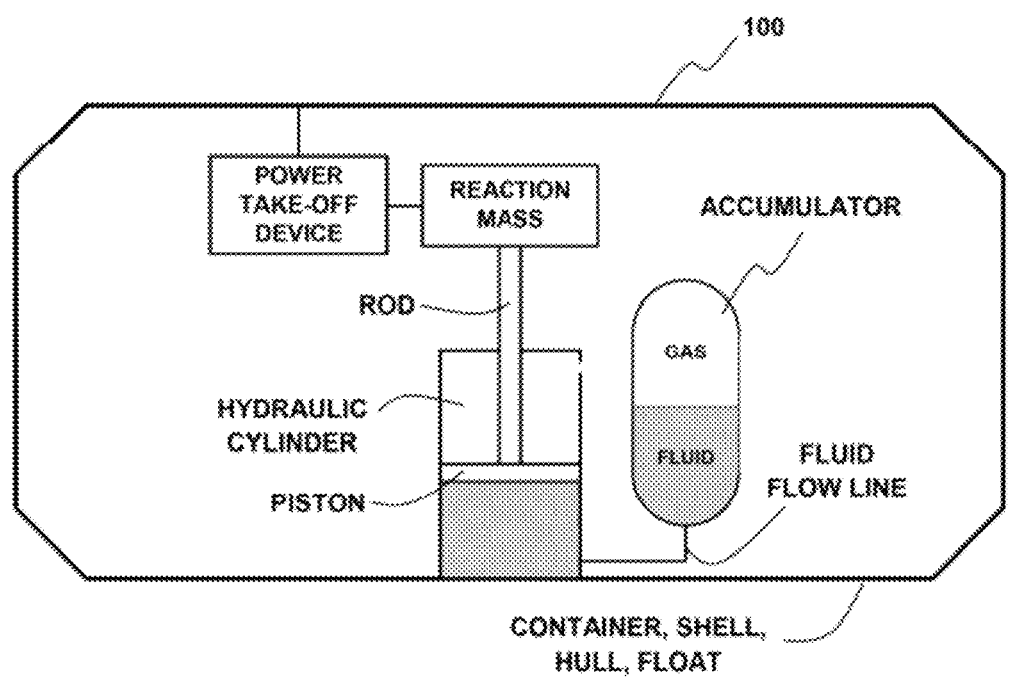
FIG. 2 – PRIOR ART

WAVE ENERGY CONVERTER WITH
ROTARY HYDRAULIC SPRING

BACKGROUND OF THE INVENTION

This invention claims priority based on the following provisional applications whose teachings are incorporated herein by reference: (a) provisional application Ser. No. 61/516,004 filed Mar. 28, 2011 and titled PITCH DRIVEN WAVE ENERGY CONVERTER (PDWEC); (b) provisional application Ser. No. 61/516,003 filed Mar. 28, 2011 and titled MULTI-MODE WAVE ENERGY CONVERTER SYSTEM; and (c) provisional application Ser. No. 61/516,025 filed Mar. 28, 2011 and titled HYDRAULIC SPRING.

This invention relates to rotary hydraulic springs which can be used instead of mechanical (i.e., physical) springs and/or linear hydraulic springs.

There are many applications where springs are required. The use of mechanical (i.e., physical) springs is often problematic because of size limitations, response time limitations and reliability considerations. This is particularly so where the mechanical springs must be able to handle very large weights (e.g., thousands of kilograms). Linear hydraulic springs using pressurized liquids and gases have been suggested as an alternative. However, as discussed below, linear hydraulic springs have severe drawbacks limiting their use.

The invention is illustrated for use in wave energy applications. However, it should be understood that the invention is of general applicability and may be used in many different applications as substitute for physical springs Problems pertaining to the use of mechanical (physical) springs are discussed in U.S. Pat. No. 7,443,046, issued to Stewart et al, (Stewart being the present applicant) whose teachings and those of U.S. Pat. No. 8,067,849 are incorporated herein by reference. As discussed in the referenced U.S. patents, a wave energy converter (WEC) buoy can be formed which includes: (a) a "float" or container that is acted upon by the waves, (b) a "reaction" mass that is totally contained within the float, (c) a physical spring and (d) a power take-off device (PTO) couple to the reaction mass and to the float. In this type of system, the reaction mass (M) is suspended from or supported by a physical spring that is connected to the float and whose force constant (k) is tuned to give the desired natural period of the WEC.

Prior art FIG. 1, which corresponds to FIG. 5 of U.S. Pat. No. 7,443,046, shows a mass-on-spring (MOS) wave energy converter (WEC) which uses mechanical (physical) springs to form a MOS oscillator within a hermetically sealed buoy shell.

Prior art FIG. 2 is a highly simplified drawing showing the use of a hydraulic spring as also taught (or suggested) in U.S. Pat. No. 7,443,046. Enclosed within a buoy shell 100 is a hydraulic cylinder coupled via a fluid flow line to an accumulator. A reaction mass is attached to a piston having a piston head which moves (up and down) within the cylinder in response to the waves impacting the buoy shell. The reaction mass is mechanically coupled to a power take off device (PTO) which produces power in response to the motion of the reaction mass. In FIG. 2, a fluid is provided which can flow between the lower portions of the hydraulic cylinder and the hydraulic accumulator via the fluid flow line. The fluid is then used to change the pressure of a gas inserted in the accumulator. That is the fluid can compress the gas when the reaction mass pushes the piston down within the hydraulic cylinder. On the other hand, the compressed gas (within the accumulator) when placed under pressure tends to push back tending to force the fluid and piston and reaction mass to move vertically up within the cylinder.

The operation of the hydraulic spring of FIG. 2 is illustrated in FIGS. 3A, 3B and 3C which demonstrate that the function of a mechanical (physical) spring can be performed using linear hydraulic cylinders coupled to linear hydraulic accumulators as disclosed in U.S. Pat. No. 7,443,046. A reaction mass is attached to a piston terminated in a piston head located within the hydraulic cylinder and the reaction mass/piston/piston head can move up and down along the cylinder. The hydraulic cylinder is connected via a flow line to the accumulator so that a fluid within the cylinder can flow back and forth between the hydraulic cylinder and the hydraulic accumulator via the flow line. FIGS. 3A, 3B and 3C show the reaction mass in three different positions. When the reaction mass is in the upper position (the piston head is near the top of the cylinder) as shown in FIG. 3A, the gas pressure in the accumulator is at its lowest, allowing the reaction mass to fall towards the center of travel. When the reaction mass is in the lower position (the piston head is near the bottom of the cylinder) as shown in FIG. 3C, the gas pressure in the accumulator is at its highest, tending to drive the reaction mass back towards the center of travel. When the reaction mass is in the middle (central) position, as shown in FIG. 3B, the gas pressure in the accumulator provides enough force on the cylinder rod to counterbalance the effect of gravity on the reaction mass. This condition reflects the setting of the "precharge" pressure which is selected to provide the desired counterbalance force provided by the hydraulic cylinder.

A significant problem with the "linear" hydraulic spring of FIGS. 2 and 3 is that hydraulic cylinders tend to have a finite life in terms of linear travel (e.g. 10,000 km of travel) before the piston and rod seal break down. As shown in FIG. 3B (see the markings at the edges) the constant rubbing at the outer periphery of the piston and piston head causes the rod seals and the piston seals to wear out or break down. Another challenge with linear hydraulic cylinders is their length (they must be at least as long as twice the stroke distance) and they require precision guiding. These problems are overcome in systems embodying the invention.

SUMMARY OF THE INVENTION

In accordance with the invention, the generally up and down movement of a reaction mass is turned into rotary motion which is used to drive a rotary hydraulic spring comprised of a rotary hydraulic pump motor and an accumulator combined to produce a "spring" function. Rotary hydraulic springs embodying the invention include rotary hydraulic pumps/motors which are known to have long service lives, making them an attractive alternative to the linear hydraulic cylinder, disclosed previously. The invention is particularly applicable to wave energy converters (WECs) having a reaction mass which needs to be coupled to a spring to ensure its oscillation and to cause it to be centered about its center of travel. In accordance with the invention, the reaction mass is coupled via a linear-to-rotary translator to a rotary hydraulic pump/motor coupled to a motor to provide a spring action to the reaction mass and ensure its oscillation. Rotary hydraulic springs formed in accordance with the invention may be used instead of physical mechanical springs or linear hydraulic cylindrical springs.

BRIEF DESCRIPTION OF THE DRAWINGS

In the accompanying drawings (which are not drawn to scale) like reference characters denote like components; and FIG. 1 is a drawing of a prior art mass-on-spring WEC using a physical spring;

FIG. 2 is a drawing of a prior art mass-on-spring WEC with a linear cylindrical spring;

DETAILED DESCRIPTION OF THE DRAWINGS

Figures 3A, 3B, 3C:
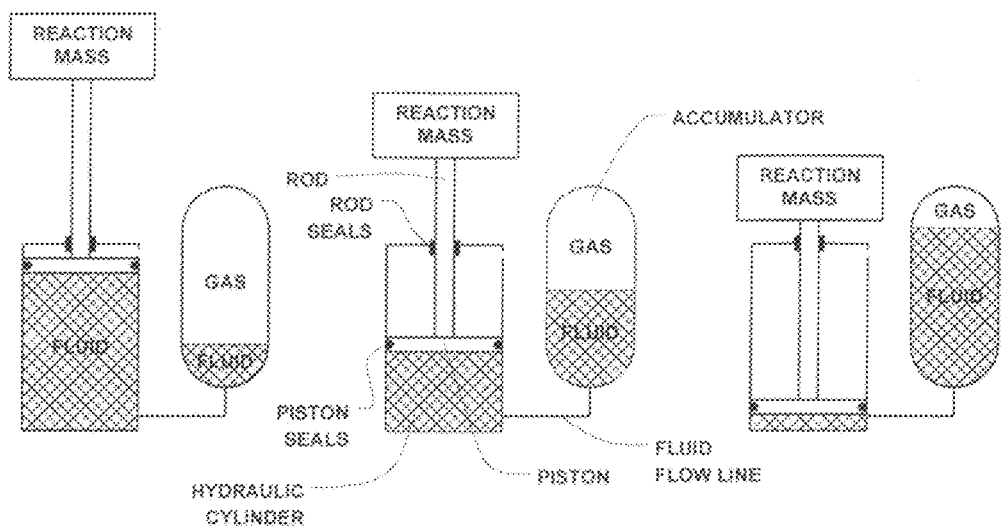
FIGS. 3A, 3B and 3C illustrate three different positions of the FIG. 2 linear cylindrical spring and a problem associated therewith.
Figure 4:
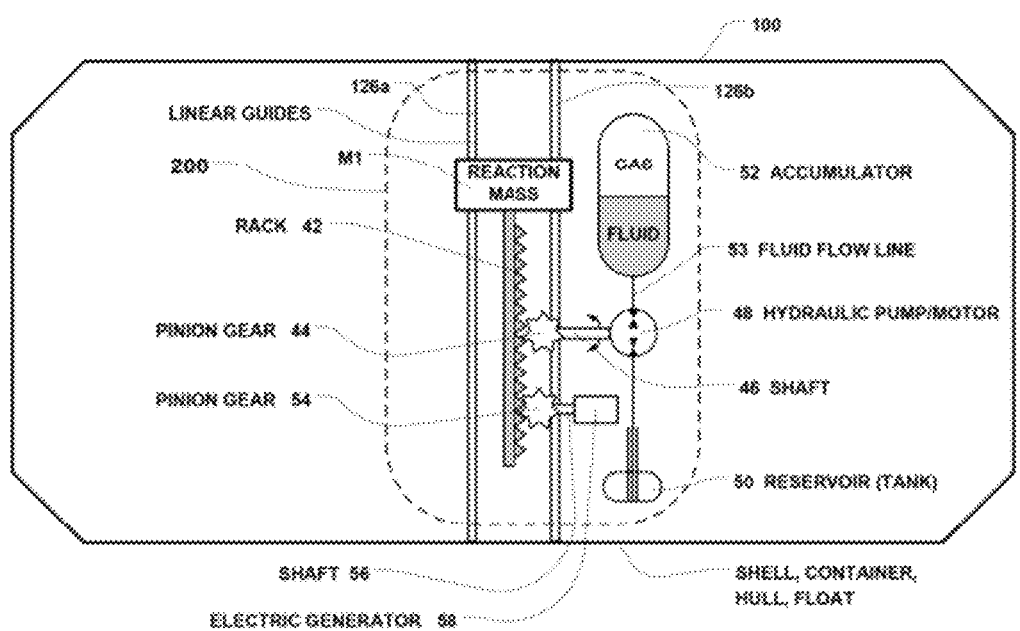
FIG. 4 is a highly simplified cross section of a WEC device having a reaction mass with linear up down motion and including a rotary hydraulic spring in accordance with the invention.

Referring to FIG. 4, there is shown a container or shell 100 in which is located a wave energy converter (WEC) device 200. The WEC device 200 includes: (a) a reaction mass, M1, which can move up and down along linear guides (126a, 126b) mounted between the top and bottom of the shell; (b) a toothed rack 42 which depends from the reaction mass and moves up and down with it in response to wave motion causing the shell 100 to move; (c) a pinion gear 44 whose teeth mesh with the rack and is caused to rotate corresponding to the up down movement of the rack; (d) the pinion gear 44 is attached to a shaft 46 which rotates as a function of the rotation of the pinion gear; (e) the shaft 46 then drives a rotary hydraulic pump/motor 48 which can cause an increase or decrease in the amount of fluid from a fluid reservoir 50 to be pushed into, or drawn from, an accumulator 52 (having a gas pocket) and thereby controlling the pressure of the gas within the accumulator; (f) the reaction mass is mechanically linked to a power take off device (PTO) to produce power. In FIG. 4 the PTO includes a pinion gear 54 whose teeth mesh with the rack 42 and (like pinion gear 44) is caused to rotate corresponding to the up down movement of the rack. Pinion gear 54 is attached to a shaft 56 which drives an electric generator 58 directly or via a gearing mechanism (not shown).

Figure 5A:
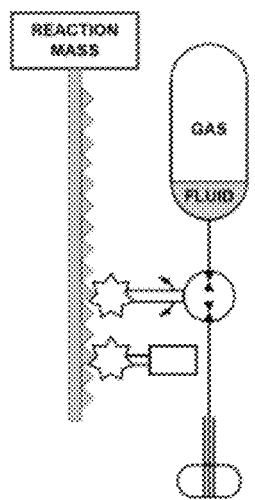
FIGS. 5A, 5B and 5C illustrate three different positions of the system of FIG. 4.
Figure 5B:
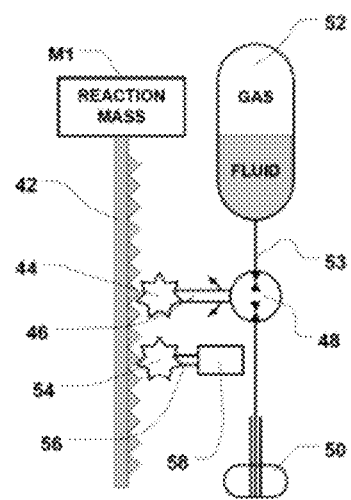
Figure 5C:
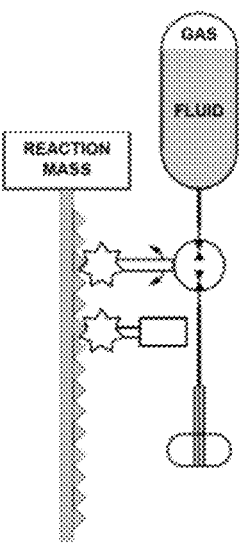

The operation of the WEC device 200 as a function of the movement of the reaction mass and the rack attached thereto in response to wave motion is shown in FIGS. 5A, 5B and 5C. As the reaction mass moves up and down, shaft 46 is rotated clock wise or counter clockwise to control the hydraulic pump/motor so that either more fluid flows into the accumulator 52 to compress the gas or some of the fluid flows out of the accumulator 52 decreasing the pressure exerted by the gas on the fluid. When the reaction mass is in the upper position as shown in FIG. 5A, the gas pressure in the accumulator is at its lowest, allowing the reaction mass to easily go towards the center of travel. When the reaction mass is in the lower position as shown in FIG. 5C, the gas pressure in the accumulator is at its highest, tending to drive the reaction mass back towards the center of travel. When the reaction mass is in the middle (central) position, as shown in FIG. 5B, the gas pressure in the accumulator provides enough force on the shaft 46 and pinion gear 44 to counterbalance the effect of gravity on the reaction mass. This condition reflects the setting of the "precharge" pressure which is selected to provide the desired counterbalance force provided by the system. The rotary hydraulic pump/motor and accumulator thus provide a "spring" function without the need for linear hydraulic cylinders or physical springs.

The volume of the accumulator is selected to provide the desired "springiness" of the system. For the same amount of gas, a physically larger accumulator provides a "softer" spring while a physically smaller accumulator provides a "stiffer" harder spring.

The ability to use the rotary hydraulic pump/motor is based on converting the linear motion of the reaction mass and its rack into rotational motion to drive the rotary hydraulic pump/motor and vice-versa on converting the rotation of the shaft of the rotary hydraulic pump/motor into linear motion of the reaction mass.

In FIG. 4, the electric generator is shown to have its own shaft. However it should be understood that the rotary electric generator could use the same shaft as the rotary hydraulic pump/motor. FIG. 4 also illustrates the use of a rack and pinion. It should be appreciated that the rack and pinion arrangement may be replaced by any other suitable mechanical or electro-mechanical devices as illustrated herein. There could be more than one WEC device within the shell 100 and they may be of different types as illustrated herein.

Figure 6:
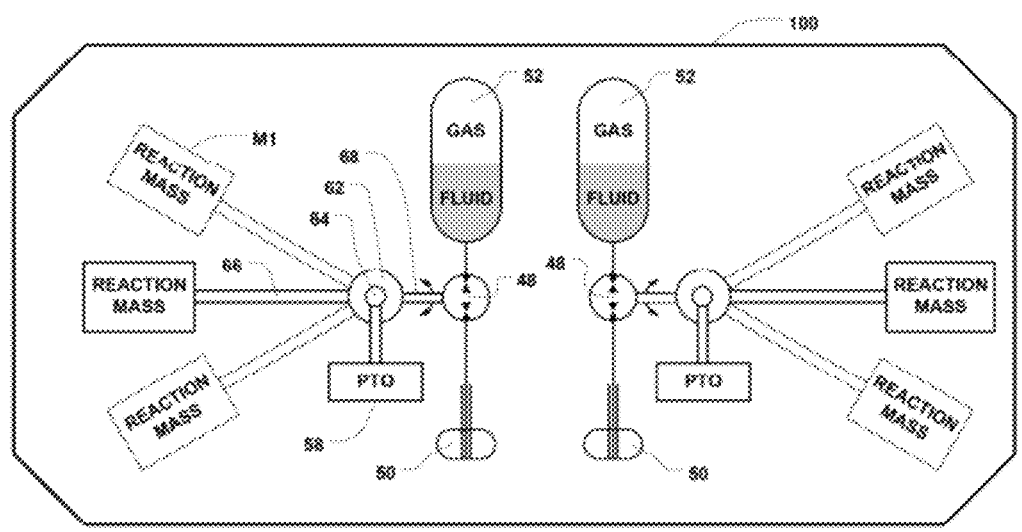
FIG. 6 is a highly simplified cross section of a WEC device having a rotating reaction mass coupled to a rotary hydraulic spring in accordance with the invention.

FIG. 6 shows that the rotary hydraulic pump-motor spring invention can be used with a WEC device that has a rotating reaction mass. In FIG. 6 two like WEC devices are shown positioned within the shell/container 100. FIG. 6 is an idealized cross-sectional view of a rotating reaction mass WEC device embodying the invention. The WEC device includes a circular drum 62 of constant radius rotatably mounted on a shaft 64 which is attached to the side of a container 100 or supported by means of one or more posts (not shown) resting on the bottom of the container 100. A reaction mass M1 is attached to one end of a rigid lever arm 66, of fixed length, who's other end is attached to the outer surface of the drum 62. A shaft 68 is attached at one end to the drum 62 and at its other end to a hydraulic pump/motor 48. Hydraulic pump/motor 48 in combination with reservoir 50 and accumulator 52 provides spring action to the shaft 68 and thence to the reaction mass. The movement of the reaction mass turns shaft 68 in a clockwise or counter clockwise direction. The movement of the shaft 68 is sufficient to cause hydraulic pump/motor 48 to cause the fluid to flow as shown in FIGS. 5A, 5B and 5C. Thus, the hydraulic pump/motor 48 provides the required spring function to enable the rotating reaction mass WEC device to operate as if a physical spring were attached to the drum. The movement of the reaction mass is then converted into useful energy (e.g., electric energy) by the PTO 58.

Figure 7:
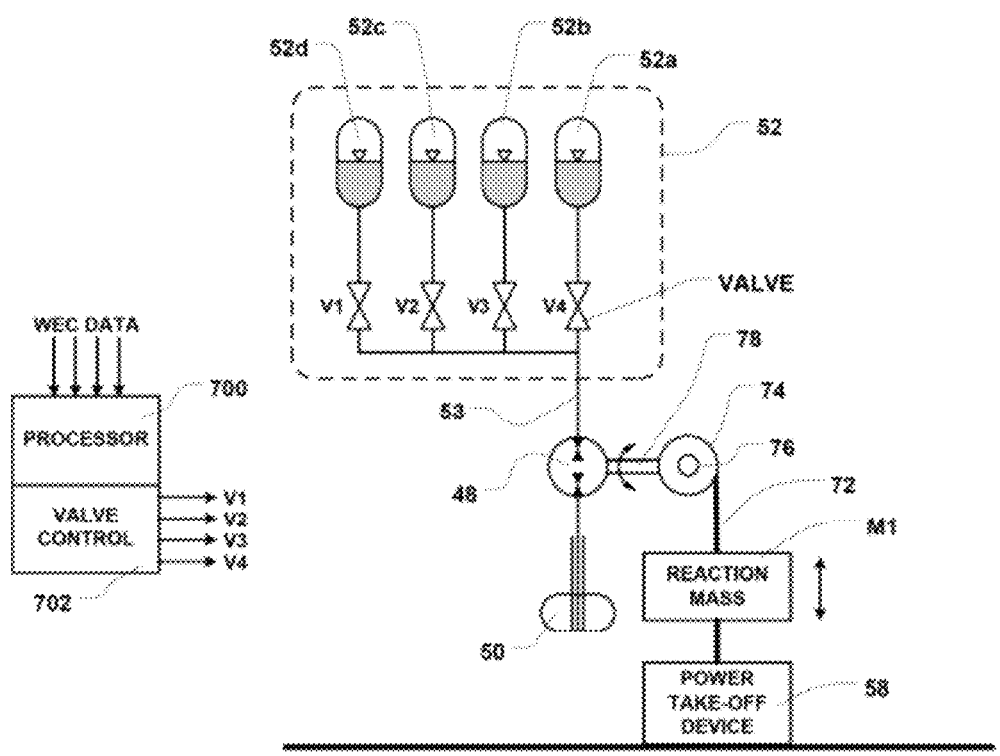
FIG. 7 is a highly simplified cross section of a reaction mass with linear up down motion coupled to a pulley to produce rotary motion to drive a hydraulic pump/motor coupled to multiple accumulators.

FIG. 7 shows another application of the invention. In this embodiment, the reaction mass M1 is supported by a cable 72 which is wound around a pulley 74 which rotates about a pivot 76. The pulley is attached to a shaft 78 which in turn is attached to the shaft of a rotary hydraulic pump/motor 48. The hydraulic pump/motor 48 can pump liquid between reservoir 50 and accumulator 52 by means of a fluid flow line 55 coupled between reservoir 50 and pump 48 and a fluid flow line 53 coupled between pump 48 and accumulator 52. In FIG. 7, the accumulator 52 is shown to have four (4) sub-accumulators 52a, b, c, d. Each sub-accumulator is coupled by its respective valve (V1, V2, V3, and V4) to fluid flow line 53 which extends between the accumulator 52 and the pump/motor 48. The valves may be any valves which are controllable (electrically or mechanically). This embodiment shows that several smaller accumulators can be used instead of one big one. More importantly, what is shown is that by having multiple accumulators, it is possible to open and close valves to connect or disconnect selected ones of the sub-accumulators. When all the sub-accumulators are connected to the rotary hydraulic pump-motor, the "springiness" of the system is "soft." When only one or two of the sub-accumulators are connected to the pump-motor, the springiness of the system is "stiff". A buoy operator can tune the spring stiffness to get the mass-spring oscillator to resonate at a desired frequency, in order to maximize the capture of energy from the waves. Alternatively, the turn on and turn off of the valves (V1, V2, V3, and V4) can be controlled (automatically) by a processor 700 (which can be programmed) which drives a valve control circuit 702 to accomplish any desired spring-like function. Note that the processor may be used to program and control the response of the system.

Significant advantages of the rotary hydraulic spring of the invention are that there are no linear components, it does not require any high-speed hydraulic motors or pumps, uses highly efficient and low cost components and simple circuitry.

Figure 8:
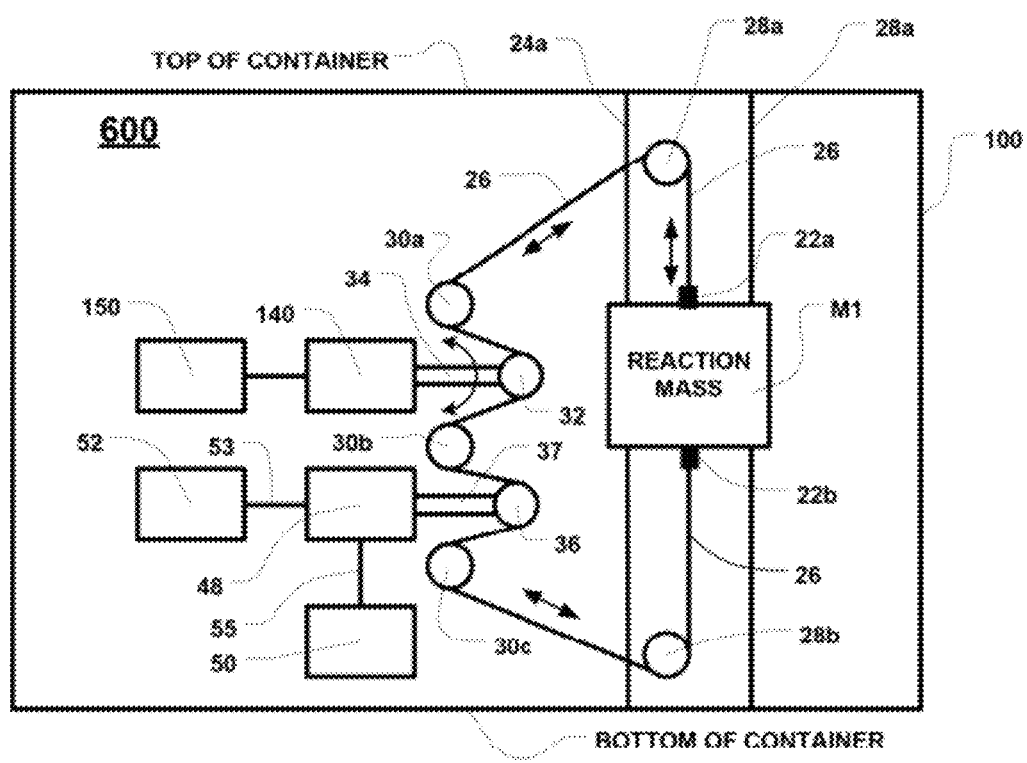
FIG. 8 is a simplified cross-sectional diagram of a WEC device using a belt/cable drive system with a rotary hydraulic spring embodying the invention.

FIG. 8 is a simplified cross sectional view of a container in which is mounted a wave energy converter (WEC) device 600 capable of: (a) efficiently responding to pitch, heave, and/or roll motions and forces when located in the front or back or, in general, along the outer periphery of the container 100; and (b) efficiently responding to heave motion and forces if located generally around the center of the container 100.

FIG. 8 shows a reaction mass M1, having a top side attachment terminal 22a and a bottom side attachment terminal 22b, which can go up and down between guide rails 24a, 24b. A belt/cable 26, firmly attached to top terminal 22a, extends from terminal 22a and is wound around a top pulley/roller 28a. The cable 26 then extends around pulley/roller 30a and is wound around a pulley 32 which drives via a shaft 34 an electric generator 140 (i.e., a PTO) also controlled by a controller 150. The cable 26 extends around pulley/roller 30b and then goes around a pulley 36 and then extends around a bottom pulley/roller 28b and then extends to terminal point 22b to which it is firmly attached. The roller/pulley 36 drives a shaft 37 coupled to a rotary hydraulic pump/motor 48 which controls fluid flow into an accumulator 52 via fluid line 53. A fluid reservoir 50 is coupled to pump/motor 48 via a fluid line 55. The pump/motor 48, the accumulator 52 and reservoir 50 provide the primary spring function to cause the reaction mss to oscillate and to be driven to the midpoint of its up down travel.

The container 100 moves in response to the waves in the body of water in which it is placed causing the reaction mass M1 moves up and down between the upper roller 28a and the lower roller 28b. Stops (not shown) may be used to prevent the reaction mass from hitting the rollers. As the reaction mass moves the cable 26 causes shafts 34 and 37 to rotate clockwise or counter clockwise. When shaft 34 rotates it drives generator 1 or is driven by generator 140 functioning as a motor. Likewise, when shaft 37 rotates it drives pump/motor 48 (increasing the pressure in the accumulator) or the shaft is driven by pump/motor 48 (responding to the pressure in the accumulator).

Controller 150 and generator/motor 140 can also be used to tend to force the reaction mass towards the center of travel in response to signals indicative of the position and velocity of the reaction mass. The generator may be programmed (controlled) to provide a spring like function. The generator behaves like a spring when the controller controls generator current in such a way as to apply a force to the belts to keep the reaction mass centered. The force is increased as the reaction mass travels farther from the midpoint, just as a mechanical spring would increase force as the displacement increases.

Figure 9:
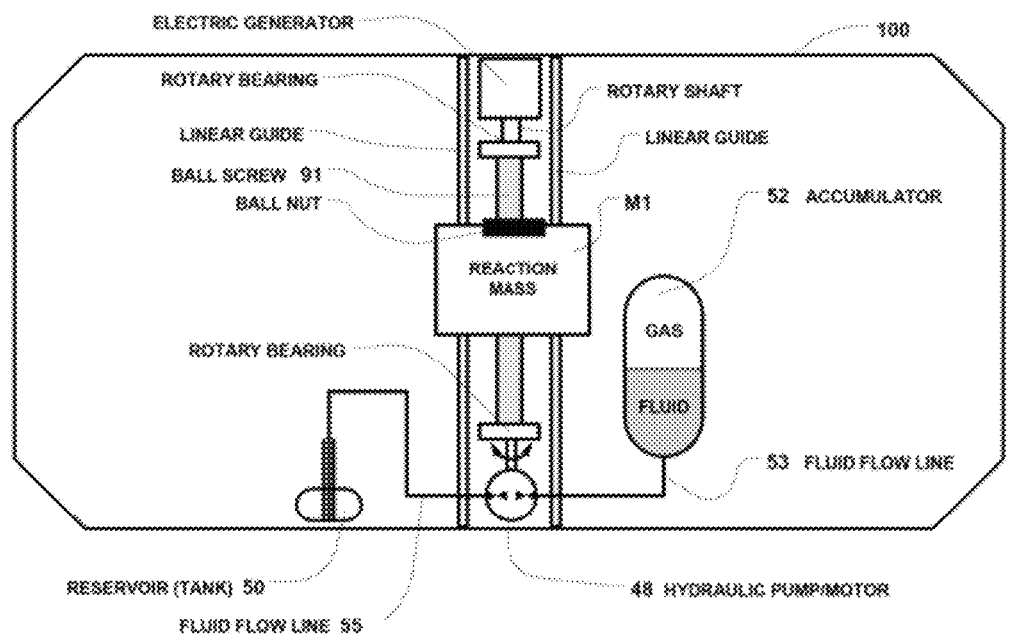
FIG. 9 is a simplified cross-sectional diagram of a WEC device whose reaction mass drives a ball and screw mechanism and wherein a rotary hydraulic spring is used to provide a spring function in accordance with the invention.

FIG. 9 shows a ball and screw driven WEC device mounted within a container 100 whose spring function includes a rotary hydraulic spring. The reaction mass M1 moves up and down in response to wave motion causing the container 100 to heave (or pitch). As M1 moves up and down, it causes a ball screw 91 to turn clockwise or counter clockwise. The shaft of the ball screw is connected to the shaft of the rotary hydraulic pump/motor 48 which controls the flow of fluid between the fluid reservoir 50 and the accumulator 52. For one condition (when the reaction mass is at or near the top), the amount of fluid in the accumulator is at a minimum (lowest level) and the pressure exerted by the gas is at a minimum. For the opposite condition (when the reaction mass is at or near the bottom), the amount of fluid in the accumulator is at a maximum and the pressure exerted by the gas is at a maximum. Thus, the rotary hydraulic pump/motor 48 provides the required spring function to enable the WEC device to operate as if a physical spring were coupled to the reaction drum.

It should be evident from the discussion above that the embodiments shown are for purpose of illustration and that many different types of WEC devices may be used to practice the invention.

What is claimed is:

1. A wave energy converter (WEC) system comprising:
a container extending along the surface of a body of water and responsive to motion of waves in the body of water;
a wave energy converter (WEC) device mounted and entirely contained within the container; said WEC device including a reaction mass located within the container and arranged to move generally up and down in response to motion of the waves;
a rotary hydraulic spring comprising a rotary hydraulic pump/motor and an accumulator, the rotary hydraulic pump/motor being rotatably coupled to the reaction mass for controlling at least one of oscillation and position of the reaction mass.

2. The WEC system as claimed in claim 1, wherein the WEC device includes a rack and pinion gear mechanism, wherein the rack is driven up and down by the reaction mass, and wherein the rack causes a rotation of the pinion gear, and wherein the pinion gear has a shaft coupled to the rotary hydraulic pump/motor.

3. The WEC system as claimed in claim 1, wherein the reaction mass is coupled via a lever arm to a cylinder which rotates as a function of the up and down movement of the reaction mass and wherein the cylinder is coupled via a shaft to the rotary hydraulic pump/motor.

4. The WEC system as claimed in claim 1, wherein the WEC device includes a belt and pulley system coupled to the reaction mass, wherein the belt moves as a function of the movement of the reaction mass, and wherein the belt is coupled to a shaft which rotates in response to the movement of the belt, and wherein the shaft is coupled to the rotary hydraulic pump/motor.

5. The WEC system as claimed in claim 1, wherein the WEC device includes a ball and screw mechanism coupled to the reaction mass, wherein the screw rotates in response to the movement of the reaction mass and wherein the rotating screw is coupled to the rotary hydraulic pump/motor.

6. The WEC system as claimed in claim 1, wherein the rotary hydraulic spring includes a reservoir for storing a liquid and wherein the rotary hydraulic pump/motor is coupled via a first fluid flow line to the reservoir and via a second fluid flow line to the accumulator and wherein a gas is included in the accumulator.

7. The WEC system as claimed in claim 1, wherein said rotary hydraulic spring is a variable spring, the springiness of the hydraulic spring being varied by selectively adding additional accumulators to said accumulator, or deleting them.

8. The WEC system as claimed in claim 1, wherein the container has a bottom inner surface and a top inner surface and wherein the WEC device includes a rail structure extending between the bottom and top inner surfaces and said reaction mass moves up and down along the rail structure.

9. The WEC system as claimed in claim 6, wherein the reaction mass moves between a top point and a bottom point; and wherein the rotary hydraulic pump/motor functions, as a pump, to increase a pressure in the accumulator when the reaction mass moves to its bottom position, and wherein the rotary hydraulic pump/motor functions, as a motor, decreasing the pressure in the accumulator when the reaction mass moves or is driven to its top position.

10. The WEC system as claimed in claim 6, wherein a power take off device is coupled to the reaction mass to convert the movement of the reaction mass into useful energy.

11. The WEC system as claimed in claim 6, wherein the accumulator includes N sub-accumulators, each sub-accumulator having an associated controllable valve for enabling or disabling the inclusion of the corresponding sub-accumulator; where N is an integer greater than one.

12. The WEC system as claimed in claim 6, wherein the accumulator includes N sub-accumulators each sub-accumulator having an associated valve for enabling or disabling the inclusion of the corresponding sub- accumulator; and wherein said WEC device includes a processor responsive to selected signals for processing these signals and applying selected signals to selected ones of the valves thereby controlling the springiness of the rotary hydraulic spring; where N is an integer greater than one.

13. The WEC system as claimed in claim 11, wherein said valves are controllable by mean of electric signals.

14. A wave energy converter (WEC) system comprising:
a container extending along the surface of a body of water and responsive to motion of waves in the body of water;
a wave energy converter (WEC) device mounted and entirely contained within the container including a reaction mass, entirely contained within the container, arranged to move generally up and down in response to motion of the waves;
a variable rotary hydraulic spring comprising: (a) a rotary hydraulic pump/motor rotatably coupled to the reaction mass; (b) N accumulators and N controllable valves, one valve per accumulator; each accumulator being coupled via its respective controllable valve to a fluid flow line coupled to said rotary hydraulic pump/motor, said N accumulators being operable to control the springiness of the variable rotary hydraulic spring; where N is an integer equal to or greater than one;
means coupled to said N controllable valves for selectively turning them on and off.

15. The WEC system as claimed in claim 14 wherein said reaction mass is coupled via a rotating shaft to the rotary hydraulic pump/motor.

16. The WEC system as claimed in claim 14 wherein the rotary hydraulic spring includes a reservoir for containing a liquid to be pumped by the hydraulic pump into or out of the accumulator; and further including a power take off device coupled to the reaction for converting the motion of the reaction mass into electric energy.

17. The WEC system as claimed in claim 14 wherein said means coupled to said N controllable valves for selectively turning them on and off includes a processor responsive to signals generated by movement of said reaction mass to control the turn on and turn off of selected valves.

\* \* \* \* \*